Oct. 23, 1962

K. G. HOER 3,060,262

FACSIMILE APPARATUS

Original Filed June 4, 1956

2 Sheets-Sheet 1

*Inventor*
K.G.HOER

By Paul W. Henninger
AGENT

Oct. 23, 1962 K. G. HOER 3,060,262

FACSIMILE APPARATUS

Original Filed June 4, 1956 2 Sheets-Sheet 2

*Inventor*
K.G.HOER
By Paul W. Hemminger
AGENT

United States Patent Office 3,060,262

Patented Oct. 23, 1962

3,060,262
FACSIMILE APPARATUS

Kenneth George Hoer, Croydon, England, assignor to Creed & Company Limited, Croydon, Surrey, England Original application June 4, 1956, Ser. No. 589,267. Divided and this application May 8, 1959, Ser. No. 811,889
Claims priority, application Great Britain June 3, 1955
4 Claims. (Cl. 178—7.1)

This invention relates to facsimile apparatus and is divided from my co-pending application Serial No. 589,267, filed June 4, 1956.

If a message on a message sheet of less than the maximum width which a facsimile transmitter can accommodate is loaded into that transmitter, there will be a waste of transmission time in the scanning head traversing the whole width of the scanner at normal scanning speed.

Again, in a facsimile transmitter having automatic accommodation to various tints of message form, scanning head should not receive light from any surface brighter than the message form itself during the scanning operation. The scanner must therefore be no lighter in hue than the darkest message form.

It therefore follows that, when a relatively light message form is used, the scanner will appear dark in comparison and will cause black to be printed on the received copy in those areas corresponding to the bare parts of the scanner. This is objectionable, and to avoid this trouble it is necessary to apply to the picture transmission channel a white signal, derived independently of the scanning head, during such times as the bare scanner is subject to the scrutiny of the scanning head.

It is an object of the present invention to provide a facsimile transmitter in which the width position of a message sheet being fed to the transmitter for scanning is sensed and the transmitter automatically adjusted in accordance with that width position.

It is a further object of the present invention to provide means for mechanically sensing the length of the message form as it is loaded to the scanner, and automatically adjusting the period during each drum revolution for which the white signal (normally referred to as the blanking signal) is injected into the picture channel.

Figures 1, 2, 4, 5:
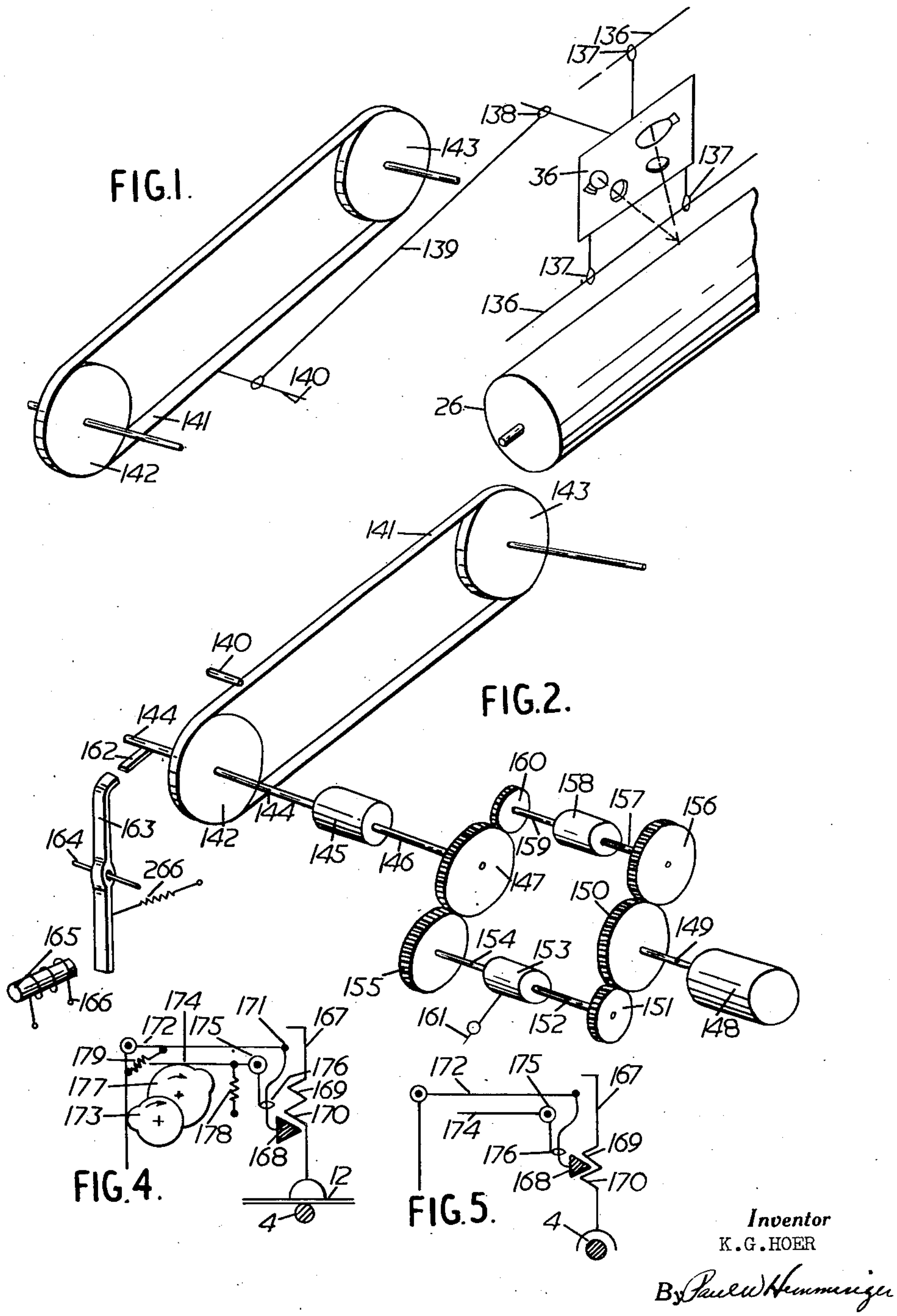
Figures 3, 6, 7, 8:
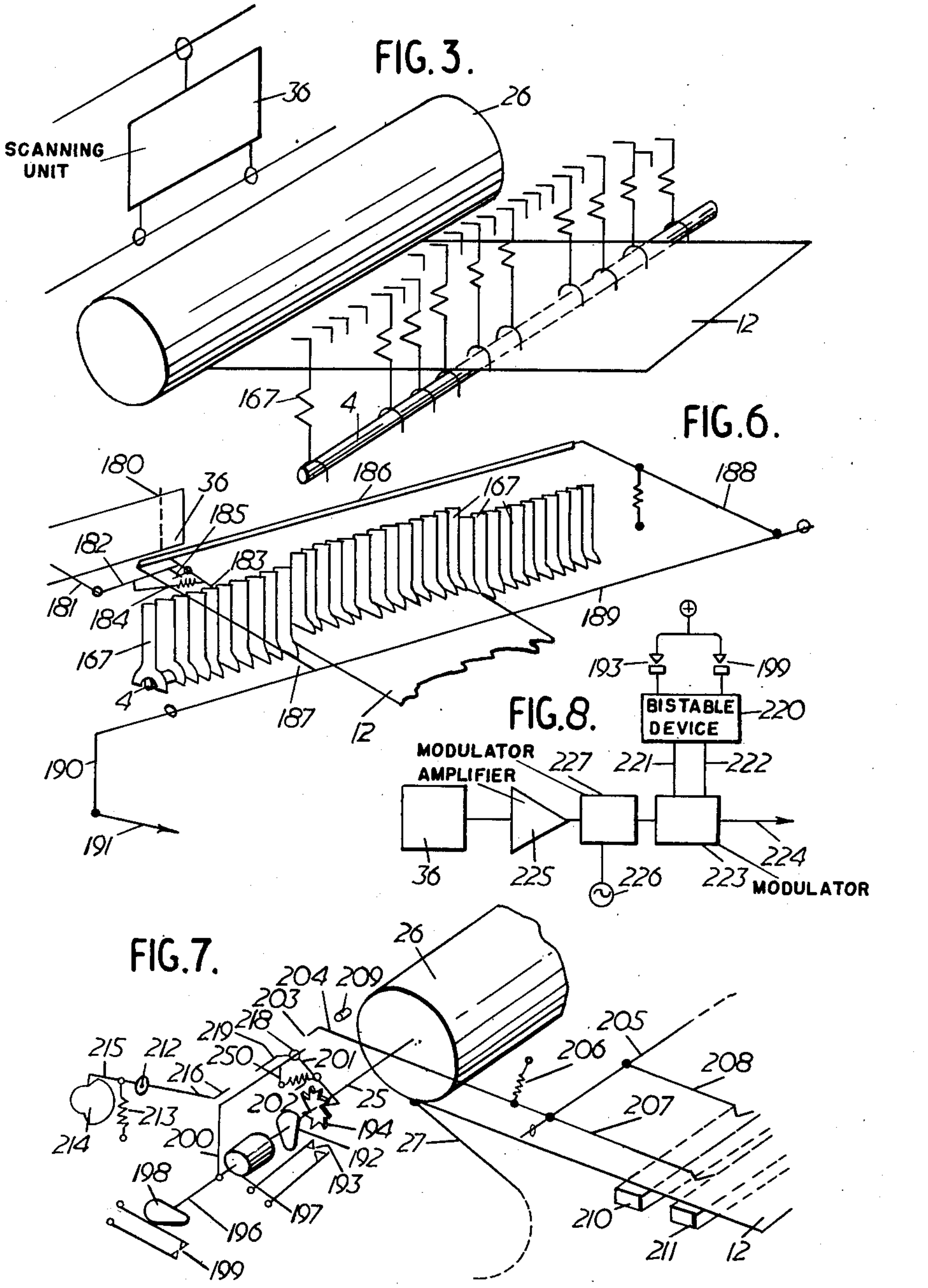

The invention will now be described in detail with reference to the accompanying drawings in which:

FIGS. 1 and 2 illustrate schematically a scanning head drive mechanism suitable for use in conjunction with the sensing mechanism of the present invention, and FIGS. 3 to 6 illustrate schematically one embodiment of sensing mechanism for determining the width position of a message sheet and a mechanism for controlling the scanning head drive of FIGS. 1 and 2, FIG. 7 illustrates schematically one embodiment of sensing means for determining the length of a message form being loaded to the scanner, and FIG. 8 shows schematically a circuit for use in conjunction with the sensing means of FIG. 7.

The invention is shown as applied to a facsimile transmitter in which a message sheet is fed automatically from a magazine to a scanning position, in this case on a drum, by the method described and claimed in my aforementioned co-pending application.

Referring first to FIG. 1, the scanning head which may be of any known type and which will not be described here, is mounted on a frame as one unit 36, having bearing surfaces 137 co-operating with guide rails 136. The scanning unit 36 is thus free to travel along the guide rails 136 parallel to the axis of the scanning drum 26.

A pin 138 is rigidly attached to the scanning unit 36. Motion along the rails 136 is imparted to scanning unit 36 through pin 138 by a link 139 which is driven by a pin 140 rigidly attached to a flexible belt 141 mounted on a driving pulley 142 and an idler pulley 143.

The driving pulley 142 is driven via shaft 144 (FIG. 2), friction clutch 145, shaft 146 and gear wheel 147. Gear wheel 147 is driven from motor 148 by either one of two paths, the paths being for fast and slow drives respectively.

The fast drive path is from motor 148 via its shaft 149, gear 150, gear 151, shaft 152, dog clutch 153, shaft 154 and gear 155 to gear wheel 147, and thence to driving pulley 142. Gear 151 is small in diameter compared with gear 150, while gear 155 has a diameter of similar size to gear 147. The slow drive path is from motor 148, via shaft 149, gear 150, gear 156, shaft 157, friction clutch 158, shaft 159 and gear 160 to gear 147 and thence to driving pulley 142. Gear 156 is of a similar size to gear 150 while gear 160 is small in comparison with gear 147. The slow drive imparts a motion to the scanning head appropriate to the scanning of a message form, while the fast drive imparts a motion suitable for scanning unoccupied parts of the drum and for returning the scanning head to the standby position.

Whether the scanning head is driven at the fast or slow speed is determined by the engagement or disengagement of dog clutch 153, which is controlled by member 161. (The way in which member 161 is controlled from the sensing mechanism will be described in connection with FIGS. 3 to 6.) When dog clutch 153 is disengaged, no drive is imparted to gear wheel 147 by the drive path 151, 152, 153, 154, 155, so gear wheel 147 is driven by the slow drive path 156, 157, 158, 159, 160. When dog clutch 153 is engaged, clutch 145 is driven forcibly by motor 148 via members 149, 150, 151, 152, 153, 154, 155, 147 and 146. In this condition shafts 159 and 157 rotate at different speeds, and this difference is accommodated by slipping friction clutch 158. The slow drive path 156, 157, 158, 159, 160, is thus overridden when clutch 153 is engaged.

Friction clutch 145 is provided to allow the belt 141 and pulley 142 and 143 to be stopped, even when dog clutch 153 is engaged. The stopping of the belt 141 and pulleys 142 and 143 is performed by the interception of a stop arm 162 attached to shaft 144 by a detent 163 pivoted at 164 and brought into co-operation with arm 162 by the force exerted by electro-magnet 165 under the control of current in its winding 166. This force is sufficient to overcome spring 266. The belt 141 may be stopped in as many positions as may be required by adding any number of members such as 162 to shaft 144. The belt 141 is released again by the removal of detent 163 from the path of stop arm 162 on receipt of a go-ahead signal.

The way in which the width and position of the message sheet on the scanning drum is determined, and the way in which this information is used to control dog clutch 153 so that the slow drive is used only over that portion of the message drum which is occupied by a message sheet will now be described with reference to FIGS. 3, 4, 5 and 6.

A plurality of sensing members 167 are simultaneously lightly impelled so that one extremity of each member approaches and attempts to pass through a plane through which all message forms must pass during their transfer from the magazine to the drum. This sensing action is caused to be synchronous with the transfer of the message form, so that some of the sensing members impinge on the form and are arrested by it, whilst others pass through the plane to the full extent of their permitted movement. The sensing action may conveniently be performed by allowing the sensing members 167 to fall under gravity, but the action could equally well be performed by impelling them under the action of a light spring.

Immediately the condition is reached wherein the sensing members 167 have adopted their differential positions, a chopper member 168 takes effect and prevents further movement of the sensing members 167, so that, notwithstanding the completion of the transfer of the message form to the drum and the concommitant vacation by the paper of the plane in which it intercepted the sensing fingers 167, the latter maintain their positions and so preserve the information as to the part of the drum on which the message lies.

Each sensing member 167 is provided with a surface over which a shoe, carried by the scanning head, may glide. The complete series of such surfaces form an effectively continuous surface having a contour corresponding to the presence and absence of paper on the drum. Registration between the paper and the contoured surface is ensured by arranging that the shoe carried by the scanning head is opposite the optical scanning point.

Referring to FIG. 3, the message sheet 12 is shown in the position between the magazine (not shown) and the scanning drum 26 which it occupies immediately before being wound into the scanning drum 26 inside the transparent wrapper (not shown). In this position a rod 4 is situated below the sheet 12, and immediately above the rod 4 there is a series of sensing members 167 which are capable of motion in a direction normal to the plane of the message sheet 12. Each of the sensing members 167 has a forked end which may either impinge on the sheet 12 or, where there is no sheet, move further downwards to straddle the rod 4. The respective positions which the sensing members 167 occupy when impinging on sheet 12 and when not obstructed by sheet 12 are shown in FIGS. 4 and 5. FIG. 3 shows the same two positions with the difference exaggerated.

Referring to FIGS. 4 and 5, there is provided a chopper bar 168 which is of sufficient length to embrace the whole series of members 167 and which co-operates with projections 169 and 170 on members 167 .

The chopper bar 168 is supported pivotally at the extremity 171 of a bellcrank 172, the other extremity of which is held in engagement with the surface of a cam 173 by a spring 179.

Another bellcrank member 174 is pivoted at 175 and has a claw 176 which embraces the support of chopper bar 168 as shown in FIGS. 4 and 5. Bellcrank member 174, through its claw 176, can therefore swing chopper bar 168 towards the sensing members 167 or away from them as dictated by another cam 177 with which it is held in engagement by spring 178. Cams 173 and 177 are both arranged to be rotated for one revolution as the scanning drum 26 is moved from a datum rest position as one message sheet is unloaded and the next one is loaded.

The sequence of events in the operation of this sensing mechanism is controlled by cams 173 and 177 and will now be described in detail.

As a message sheet 12 is fed from the magazine to the scanning drum 26, the bar 168 is in contact with the sensing members 167. Members 167 may be assumed to be in their highest position so that their projections 170 are above bar 168, and bar 168 supports members 167 in that position.

In FIG. 4 the position of cams 173 and 177 is shown after they have moved through about 90°.

As cam 177 rotates from the start position in a clockwise direction, the hump thereon causes bellcrank 174 to move clockwise against the action of spring 178 and withdraw bar 168 from members 167 which then become unsupported and drop towards rod 4. Some of the members 167 are intercepted in their fall by message sheet 12 (as shown in FIG. 4) while others are beyond the edges of sheet 12 and so drop further to the position shown in FIG. 5. After this opportunity to drop has been afforded to members 167 and while the hump on cam 177 is still in engagement with bellcrank 174, the hump on cam 173 forces bellcrank 172 in a clockwise direction against spring 179, thereby lowering bar 168 to the level shown in FIGS. 4 and 5. Cam 177 then moves its hump out of engagement with bellcrank 174 and allows bar 168 to move into co-operation with either projection 169 (as in FIG. 5) or projection 170 (as in FIG. 4) of member 167, depending on the position of member 167. The sensing members 167 are thereby retained in the respective positions which they have adopted.

As soon as possible after bar 168 has renewed its co-operation with members 167, the hump on cam 173 moves out of engagement with bellcrank 172 and allows this bellcrank to be moved in an anti-clockwise direction by spring 179. Pivot 171, bar 168 and members 167 are therefore all raised. The pressure of members 167 is thus removed from message sheet 12 and the transfer of this sheet to the scanning drum is facilitated, and at the same time members 167 are brought to a sufficiently high position from which they are ready to drop afresh on to the next message sheet during the next loading action. It should be noted that, during the raising action, members 167 preserve their relative positions which define the width of the message sheet.

This information of the width of the message sheet is utilised to control the operation of dog clutch 153 by member 161. The utilisation mechanism includes a gliding shoe carried by the scanning head, the gliding shoe rising and falling as it rides over the upper extremities, of sensing members 167. This motion of the gliding shoe, raises and lowers a bail carried on a rockshaft. The rockshaft thus has two angular positions corresponding to the high or low positions of the sensing members 167, and is therefore able to cause engagement and disengagement of the dog clutch 153 via a linkage provided for this purpose.

Referring to FIG. 6, scanning unit 36 having its optical pick-up axis at 180 carries an extension 181 upon which is pivoted arm 182. Arm 182 is a T-shaped arm, one portion of the T being positioned beneath a bail 186 and the other portion of the T carrying a shoe 183.

Shoe 183 is pivotally attached to arm 182 and urged by spring 184 against a stop face 185, which is integral with arm 182. The purpose of this arrangement is to ensure that whilst the carriage is moving in the scanning direction the shoe 183 abuts stop 185, and when raised members 167 are encountered the arm 182 is raised, and that whilst the carriage is returning spring 184 yields when shoe 183 encounters raised members 167 so that shoe 183 pivots and arm 182 is not raised.

Resting on arm 182 is a bail 186 carried on arms 187 and 188 extending from rockshaft 189. Thus, when shoe 183 encounters raised members 167 and arm 182 rises, bail 186 is raised by arm 182 and rockshaft 189 moves clockwise. Arm 190 extending from rockshaft 189 is connected by pivoted link 191 to the member 161 in such a way that rasing of bail 186 results in the dog clutch 153 being disengaged. This may be performed in any well known manner.

Referring now to FIG. 7, a message drum shaft 25 is provided with a cam 192 controlling contacts 193 and a ratchet wheel 194. Coupled to shaft 25 by friction clutch 197 is a further shaft 196 carrying a cam 198, controlling contacts 199, and an arm 200 to the extremity of which is pivoted pawl 201.

Pawl 201 is urged by spring 202 to engage with ratchet wheel 194 and is provided with a tail 203 adapted to co-operate with arm 204 extending from shaft 205. Arm 204 is urged by spring 206 towards stop 209. Also extending from shaft 205 are several sensing members such as 207 and 208 which bear on the message form 12 during that phase of its transfer to the scanning drum 26 in which it passes over supports 210 and 211. The extremities of members 207, 208 are contoured so that they are capable of dropping into the gap between supports 210 and 211 when the message form 12 has traveled sufficiently far for its trailing edge to clear the gap between supports 210 and 211.

A further member 215 pivoted at 212 is urged by spring 213 towards cam 214. When member 215 falls into the depression on cam 214 its other extremity 216 enters the orbit of arm 200.

During the unloading of a scanned message shafts 25 and 196 move anticlockwise, so that arm 200 moves anticlockwise in its orbit and member 215 is, during that time, lowered into the depression in cam 214. Consequently, extremity 216 of member 215 is in the path of arm 200 and, when abutment occurs, friction clutch 197 slips until drum 26 and shaft 25 reach the limit of their angular motion. While this slippage occurs, pawl 201 trails over the teeth of ratchet 194. At the cessation of the slippage, cam 214 will have been set at a known angular position with respect to drum 26. In the unloaded position of the apparatus the cams 192 and 198 are angularly related such that, if the drum were rotated for scanning, cam 192 would operate its contacts 193 as the leading edge of the wrapper passed the scanning point, and the cam 198 would operate its contact 199 as the position on the drum corresponding to the end of a message sheet stretching from the leading edge of the wrapper to the ends of the sensing members 207, 208, passed the scanning point.

During the loading of a message form the shafts 25 and 196 move in a clockwise direction, and message form 12 is caused to move leftwards over supports 210 and 211 and sensing members 207 and 208 are raised so that arm 204 is lowered into the orbit of tail 203 of pawl 201. Pawl 201 therefore tilts anticlockwise about its pivot 218 and is thus disengaged from ratchet 194. The pawl reaches the limit of its rotation about pivot 218 as determined by its stop face 219 abutting arm 200, and thereafter friction clutch 197 slips, thus causing a change of orientation of cam 198 with respect to cam 192. This slippage continues until the trailing edge of message form 12 has passed beyond the gap between supports 210 and 211 when sensing members 207, 208 drop into the gap and arm 204 is moved out of the orbit of tail 203 of pawl 201. Pawl 201 engages with ratchet 194 and thereafter shafts 25 and 196 rotate together. The angular slippage, and therefore the difference of orientation of cams 192 and 198 having been dependent on the size of the message form, is, by suitable geometry, made to correspond precisely with the extent of the occupied part of the drum.

During the scanning of the message sheet 12, shaft 25 and drum 26 are rotated in a clockwise direction. Shaft 196 is also rotated in a clockwise direction by shaft 25 through friction clutch 197. Therefore, in each rotation of the scanning operation, cams 192 and 198 close their respective contacts 193 and 199. These contacts 193 and 199 themselves control a bi-stable device 220 (FIG. 8).

When the scanning of the message sheet 12 commences (in each revolution), the contacts 193 close and bi-stable device 220 is operated into a condition in which it supplies to a modulator 223 over conductor 221 a signal which will be referred to as a "mark" signal. Later in each revolution and at a time dependent on the length of the message sheet 12, the contacts 199 close and operate the bi-stable device 220 into a condition in which it supplies to modulator 223 over conductor 222 a signal which will be referred to as a "space" signal. Also applied to modulator 223 are facsimile intelligence signals determined by scanner 36 and amplifier 225, which control, through modulator 227, the carrier current from source 226. The modulator 223 is adapted to allow facsimile signals from modulator 227 to be passed to the outgoing channel 224 when a "mark" signal is applied over conductor 221 and to prevent this passage of facsimile signals when a "space" signal is applied over conductor 222. When a "space" signal is applied to conductor 222, a white signal is impressed on outgoing channel 224, in spite of the fact that a black signal may be being applied to modulator 223 from modulator 227.

What is claimed is:

1. Facsimile transmitter apparatus comprising: scanning apparatus for scanning message sheets of a given width; sensing means operative to sense the width of a message sheet comprising a plurality of sensing members arranged across the path of a message sheet during its passage into the scanning position, means for urging said sensing members towards said sheet to cause the members engaging said sheet to assume a first position and the remaining members to assume a second position, means for holding the said sensing members in the positions assumed; means for selectively operating the scanning apparatus at fast and slow speeds, said means controlled by the positions assumed by the sensing members in that the slow drive means will be operated over the width of the sheet where the sensing members have assumed the first position and the fast drive means will be operated outside the width where the sensing members have assumed the second position.

2. Facsimile transmitter apparatus as set forth in claim 1, and means for feeding message sheets into scanning position in said scanning apparatus, the said sensing means sensing the width of a message sheet as it is fed into said scanning apparatus.

3. Facsimile transmitter apparatus comprising: means for feeding a message sheet into a scanning position; scanning means for scanning said message sheet to produce facsimile signals representative of the subject matter on said message sheet; an outgoing line; transmitting means controlled by said scanning means for passing said facsimile signals to said outgoing line; first and second sensing means operative during the feeding of a message sheet into scanning position to determine the length and width, respectively, of said message sheet, said first sensing means comprising two sets of electrical contacts, first and second cams for operating the respective sets of contacts and means for altering the position of the second cam relative to the first cam, said means comprising a ratchet and pawl arrangement which is held out of engagement by said sensing means while the message sheet is in contact with the sensing means, means controlled by the said first sensing means for preventing the transmission of facsimile signals to the said outgoing line when said sensing means is traversing a portion of the length of said scanning position outside the length dimensions of said message sheet, means controlled by the second sensing means for altering the scanning speed when the scanning means is traversing a portion of the scanning position outside of the width dimensions of said message sheet.

4. Facsimile transmitter apparatus as claimed in claim 3, in which said first sensing means comprises a plurality of sensing members spring urged into contact with said message sheet as the message sheet is fed into the transmitter.

References Cited in the file of this patent

UNITED STATES PATENTS

| | | |
|---|---|---|
| 2,718,548 | Jelinek | Sept. 20, 1955 |
| 2,903,511 | McCann | Sept. 8, 1959 |
| 2,982,815 | Buckingham | May 2, 1961 |